Patented June 27, 1961

2,990,321
BIS-(HALOPHENYL)-FLUOROALIPHATIC COMPOUNDS AS DDT SYNERGISTS

Joseph Bornstein, Brighton, Mass., Murray S. Blum, Baton Rouge, La., and John J. Pratt, Jr., Wayland, Mass., assignors to the United States of America as represented by the Secretary of the Army
No Drawing. Filed July 28, 1958, Ser. No. 751,579
21 Claims. (Cl. 167—30)
(Granted under Title 35, U.S. Code (1952), sec. 266)

The invention described herein, if patented, may be manufactured and used by or for the Government for governmental purposes, without the payment to us of any royalty thereon.

This invention relates to insecticides and more particularly to new bis-(halophenyl)-fluoroaliphatic compounds having insecticidal properties, and which are particularly useful as synergists for DDT (1,1-bis-(p-chlorophenyl)-2,2,2-trichloroethane).

Compounds of this invention have the general structure:

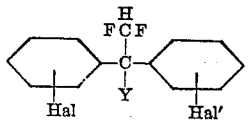

wherein Hal and Hal' are halogen atoms of an atomic weight not above 80 (i.e., fluorine, chlorine and bromine), and wherein Y is hydrogen, hydroxyl or acetoxyl. Compounds falling under this general formula are 2,2-difluoro-1,1-bis-(p-halophenyl)-ethanes, 2,2-difluoro-1,1 - bis - (p-halophenyl)-ethanols, and 2,2-difluoro-1,1-bis-(p-halophenyl)-ethyl acetates. Also within the purview of our invention are dehydrofluoro ethene analogs of 2,2-difluoro-1,1-bis-(p-halophenyl)-ethanes, which analogs have the general formula:

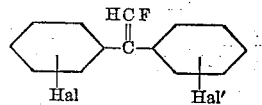

The foregoing compounds may be prepared by a Grignard type reaction, as will be more fully explained hereafter.

Tests have shown that among the foregoing compounds the 2,2-difluoro-1,1-bis-(p-halophenyl)-ethanols are highly potent insecticides, and are surprisingly and strikingly effective as synergists for DDT; these effects are particularly striking when the halogen atoms on the respective phenyl groups are either chlorine or bromine. However, the other compounds herein disclosed are likewise valuable weapons in the arsenal of economic entomology, inasmuch as experience has shown that succeeding generations of insects quickly acquire immunity to a given type of insecticide through the breeding of resistant strains. It is therefore important to have alternate insecticides and insecticidal synergists on hand to combat insects which have thus acquired immunity against a previously very effective insecticide.

We are now aware (though this was not known to us at the outset of our research) that 2,2,2-trifluoro-1,1-bis-(p-halophenyl)-ethanes, ethanols and ethyl acetates have been disclosed as synergists for DDT (see Tahori in Journal of Economic Entomology, 1955, vol. 48, pp. 638–642, and Kaluszyner et al. in American Chemical Society Journal, 1955, vol. 77, pp. 4164–4168); however, we have found surprisingly that our 2,2-difluoro compounds have unexpectedly more powerful synergistic insecticidal action in combination with DDT than the results obtained by the foregoing workers with 2,2,2-trifluoro compounds would have permitted to expect.

We will now proceed to illustrate the practice of our invention by means of several examples, but wish to have it understood that we do not intend to limit the practice of our invention to the particular methods therein set forth, inasmuch as our novel compounds can be made by other syntheses and may be combined with DDT in any desired proportion, as may be most effective under the circumstances of a particular application.

EXAMPLE 1

*2,2-difluoro-1,1-bis-(p-chlorophenyl)-ethanol*

Freshly purified ethyl difluoroacetate (20.0 g., 0.16 mole), diluted with an equal volume of ether, was added with stirring in the course of 1 hr. to the ice-cold Grignard reagent prepared from 10.7 g. (0.44 g.-atom) of magnesium turnings and 81 g. (0.44 mole) of 1-bromo-4-chlorobenzene in 100 ml. of ether. Stirring and cooling in the ice-bath were maintained for 2 hours after completion of the addition of the ester. The reaction mixture, after standing at room temperature overnight, was treated, while stirring and cooling, with saturated ammonium chloride, prepared by shaking 40 g. of the salt with 100 ml. of water. The yellow suspension was filtered with suction through a sintered-glass funnel, the filter cake was washed with ether, and the combined ethereal extract washed twice with water before being dried over sodium sulfate. Evaporation of the ether yielded a dark orange oil which was diluted with an equal volume of methanol and refrigerated at −35° for 2 days in order to allow the traces of biphenyl to crystallize. Filtration of the mixture followed by steam distillation of the filtrate (2 l. of distillate was collected and discarded) gave a product which was essentially free of starting material and derived products. The oily residue was dissolved in ether and dried over sodium sulfate. Removal of the solvent and distillation of the residue afforded a 53% yield of 2,2-difluoro-1,1-bis-(p-chlorophenyl)-ethanol, a liquid having a B.P. of 130–136° C. at 0.20 mm.; index of refraction $n_D^{20}$ 1.5780. With concentrated $H_2SO_4$ it gave a cherry-red color. Analysis ($C_{14}H_{10}Cl_2F_2O$):

|  | Calculated | Found |
|---|---|---|
| C | 55.47 | 55.63 |
| H | 3.33 | 3.47 |
| Cl | 23.40 | 23.94 |

The m-chlorophenyl and o-chlorophenyl analogs are produced by substituting the same amounts of 1-bromo-3-chlorobenzene or 1-bromo-2-chlorobenzene in lieu of the 1-bromo-4-chlorobenzene of the above example.

EXAMPLE 2

*2,2-difluoro-1,1-bis-(p-bromophenyl)-ethanol*

Example 1 was repeated, but a stoichiometrically equivalent amount (104 grams; 0.44 mole) of 1,4-dibromobenzene was used in lieu of 1-bromo-4-chlorobenzene. A 40% yield of 2,2-difluoro-1,1-bis-(p-bromophenyl)-ethanol was obtained as a liquid which had a boiling point of 153–164° C. at 0.17 mm.; index of refraction $n_D^{26.5}$ 1.6039. With concentrated $H_2SO_4$ it gave a red color. Analysis ($C_{14}H_{10}Br_2F_2O$):

|  | Calculated | Found |
|---|---|---|
| C | 42.88 | 42.9 |
| H | 2.57 | 2.4 |
| Br | 40.77 | 40.5 |

Upon prolonged standing, thick prisms formed, having a M.P. of 54.5–56° C.

EXAMPLE 3

2,2-difluoro-1,1-bis-(p-fluorophenyl)-ethanol

Example 1 was repeated, but a stoichiometrically equivalent amount (0.44 mole) of 1-bromo-4-fluorobenzene was used in lieu of 1-bromo-4-chlorobenzene. A 43% yield of 2,2-difluoro-1,1-bis-(p-fluorophenyl)-ethanol was obtained in liquid form having a B.P. of 99–100° C. at 0.05 mm.; index of refraction $n_D^{24}$ 1.5276. With concentrated $H_2SO$ it gave a red-orange color. Analysis ($C_{14}H_{10}F_4O$):

|   | Calculated | Found |
|---|---|---|
| C | 62.23 | 62.5 |
| H | 3.73 | 3.7 |

EXAMPLE 4

2,2-difluoro-1,1-bis-(p-halophenyl)-ethyl acetate

The 2,2-difluoro-1,1-bis-(p-chlorophenyl)-ethanol of Example 1 was permitted to stand at room temperature for several hours with a mixture of acetic acid and trifluoro acetic anhydride, in accordance with the procedures generally set forth by Tedder in Chem. Revs. 55, 787 (1955). The resulting product was extracted with petroleum ether solvent and recrystallized. A 82% yield of 2,2-difluoro-1,1-bis-(p-chlorophenyl)-ethyl acetate crystals having a M.P. of 86.0–86.8° C. was obtained. Analysis ($C_{16}H_{12}Cl_2F_2O_2$):

|   | Calculated | Found |
|---|---|---|
| C | 55.67 | 55.8 |
| H | 3.50 | 3.3 |

2,2-difluoro-1,1-bis-(p-bromophenyl)-ethyl acetate crystals having a M.P. of 80–80.5° C. were obtained in the same manner in an 86% yield from the 2,2-difluoro-1,1-bis-(p-bromophenyl)-ethanol of Example 2. Analysis ($C_{16}H_{12}Br_2F_2O_2$):

|   | Calculated | Found |
|---|---|---|
| C | 44.25 | 44.3 |
| H | 2.79 | 2.9 |
| Br | 36.8 | 36.8 |

An 89% yield of 2,2-difluoro-1,1-bis-(p-fluorophenyl)-ethyl acetate was obtained in liquid form from the 2,2-difluoro-1,1-bis-(p-fluorophenyl)-ethanol of Example 3; it resisted attempts to induce crystallization and isolated as a very viscous oil at 80° C. and 0.1 mm. pressure; index of refraction $n_D^{25}$ 1.5158. Analysis ($C_{16}H_{12}F_4O_2$):

|   | Calculated | Found |
|---|---|---|
| C | 61.53 | 61.8 |
| H | 3.87 | 3.9 |

EXAMPLE 5

2,2-difluoro-1,1-bis-(p-halophenyl)-ethane 8.0–10.0 grams of 2,2-difluoro-1,1-bis-(p-chlorophenyl)-ethanol (Ex. 1) were heated under reflux for ten days with a mixture of 3.5 g. of red phosphorus, 1.27 g. of iodine, 50 ml. of glacial acetic acid, and 1.0 ml. of water. The cooled reaction mixture was filtered with suction directly into a separatory funnnel containing 300 ml. of 2.5% sodium bisulfite. The oily suspension was neutralized by adding portions of solid sodium bicarbonate with intermittent shaking and was then extracted with ether. The ether extract was dried over sodium sulfate after being washed with water. Removal of the ether and distillation of the residue in vacuo yielded an oil which spontaneously crystallized. The crude crystals were recrystallized by means of a methanol-water solvent, and a 90% yield of 2,2-difluoro-1,1-bis-(p-chlorophenyl)-ethane crystals having a M.P. of 37.5°–38.5° C. and a B.P. of 110–118° C. at 0.08 mm. pressure was obtained. Analysis ($C_{14}H_{10}Cl_2F_2$):

|   | Calculated | Found |
|---|---|---|
| C | 58.56 | 58.8 |
| H | 3.51 | 3.5 |
| Cl | 24.69 | 24.8 |

2,2-difluoro-1,1-bis-(p-bromophenyl)-ethane crystals were obtained in a 89% yield from the 2,2-difluoro-1,1-bis-(p-bromophenyl)-ethanol of Example 2 in the same way as the chloro analog; methanol was used as the solvent for recrystallization. M.P. 42.0–42.8° C. Analysis ($C_{14}H_{10}Br_2F_2$):

|   | Calculated | Found |
|---|---|---|
| C | 44.70 | 44.80 |
| H | 2.68 | 2.8 |
| Br | 42.48 | 42.5 |

2,2-difluoro-1,1-bis-(p-fluorophenyl)-ethane was obtained in the form of a viscous oil from the 2,2-difluoro-1,1-bis-(p-fluorophenyl)-ethanol of Example 3 in a 90% yield. It resisted attempts to crystallize; its B.P. is 79–80° C. at 1.5 mm. pressure; index of refraction $n_D^{24}$ 1.5179. Analysis ($C_{14}H_{10}F_4$):

|   | Calculated | Found |
|---|---|---|
| C | 66.14 | 66.6 |
| H | 3.97 | 4.0 |

EXAMPLE 6

Dehydrofluoridation products—$(C_6H_4Hal)_2C{:}CHF$, 2-fluoro-1,1-bis-(p-halophenyl)-ethene 3.8 grams of 2,2-difluoro-1,1-bis-(p-bromophenyl)-ethane (Ex. 5) were dehydrofluorinated (removal of 1 mole of hydrogen fluoride) by heating under reflux for 2.5 hours with 60 ml. of 2% ethanolic potassium hydroxide. The solvent was removed under reduced pressure and the residue extracted with several portions of ether. The combined ethereal extract was washed with water and dried over magnesium sulfate. Removal of the ether afforded a colorless oil which was distilled at diminished pressure. Upon recrystallization with methanol there was obtained an 85% yield of 2-fluoro-1,1-bis-(p-bromophenyl)-ethene crystals having a M.P. of 84.2–85.2° C. Analysis ($C_{14}H_9Br_2F$):

|   | Calculated | Found |
|---|---|---|
| C | 47.20 | 47.0 |
| H | 2.55 | 2.4 |
| Br | 44.86 | 44.7 |

Crystals of 2-fluoro-1,1-bis-(chlorophenyl)-ethene were obtained in the same manner from 2,2-difluoro-1,1-bis-(p-chlorophenyl)-ethene of Example 5, in an 85% yield; M.P. 78.0–79.5° C. Analysis ($C_{14}H_9Cl_2F$):

|   | Calculated | Found |
|---|---|---|
| C | 62.91 | 62.9 |
| H | 3.39 | 3.4 |
| Cl | 26.52 | 26.4 |

Liquid 2-fluoro-1,1-bis-(p-fluorophenyl)-ethene was obtained from 2,2-difluoro-1,1-bis-(p-fluorophenyl)-ethane in a 93% yield; B.P. 81–82° C. at 1 mm. pressure, index of refraction $n_D^{24.5}$ 1.5481. Analysis ($C_{14}H_9F_3$):

|   | Calculated | Found |
|---|---|---|
| C | 71.79 | 71.9 |
| H | 3.87 | 4.0 |

The following table (Table I) shows the biological results obtained by testing the foregoing compounds on houseflies.

The first column of test results indicates the lethal effect of our compounds, applied alone to ordinary DDT susceptible adult female houseflies which were treated topically by applying acetone solutions of the compounds to the thorax (1 microliter of the solutions were applied in each instance).

Mortality data were taken 24 hours after treatment of the flies. One hundred and sixty flies were used in each test—4 replicates of 20 flies each duplicated from 2 different fly populations. The quantity of test compound required to kill 50% of the test flies (LD-50) was determined by plotting on a logarithmic scale percent mortality versus doses of test compound.

The second column of test results shows the synergistic action of our compounds in combination with DDT, when applied to a DDT-resistant strain of adult female houseflies in the same manner. The ratio of fluoro compounds to DDT was one part of fluoro compound to 5 parts of DDT.

TABLE I

|   | $LD_{50}$ | |
|---|---|---|
|   | DDT-Susceptible Flies, Fluoro Compound Alone | DDT-Resistant Flies, 1 Part Fluoro Compound, 5 Parts DDT |
| 2,2-Difluoro-1,1-bis-(p-chlorophenyl)-ethane | 2.2 | 0.96 |
| 2,2-Difluoro-1,1-bis-(p-chlorophenyl)-ethanol | 3.8 | 0.62 |
| 2,2-Difluoro-1,1-bis-(p-chlorophenyl)-ethyl acetate | 9.4 | 1.6 |
| 2-Fluoro-1,1-bis-(p-chlorophenyl)-ethene | 22 | 11.5 |
| 2,2-Difluoro-1,1-bis-(p-bromophenyl)-ethane | 2.1 | 0.96 |
| 2,2-Difluoro-1,1-bis-(p-bromophenyl)-ethanol | 4.9 | 0.56 |
| 2,2-Difluoro-1,1-bis-(p-bromophenyl)-ethyl acetate | 9.7 | 1.7 |
| 2-Fluoro-1,1-bis-(p-bromophenyl)-ethene | 20 | 7.1 |
| 2,2-Difluoro-1,1-bis-(p-fluorophenyl)-ethane | 5.1 | 7.0 |
| 2,2-Difluoro-1,1-bis-(p-fluorophenyl)-ethanol | 7.2 | 2.8 |
| 2,2-Difluoro-1,1-bis-(p-fluorophenyl)-ethyl acetate | 35 | 8.5 |
| 2-Fluoro-1,1-bis-(p-fluorophenyl)-ethene | 18 | 28 |
| Control: DDT alone | 0.35 | [1] 150 |

[1] (No fluoro compound, 6 parts DDT.)

In a further control experiment with the DDT-resistant strain of flies, a mixture of 1 part of 1,1-bis-(p-chlorophenyl)-ethanol (DMC, a known DDT synergist) and 5 parts of DDT was found to have an $LD_{50}$ of 3.9, which is less potent than most of our new compounds.

It appears from the foregoing test results that the compounds of the present invention are effective as insecticides, even when applied alone to insects which have not yet bred immunity to DDT, even though the quantity of our fluoro compounds to achieve the desired insect mortality is larger than a corresponding quantity of DDT. However, as pointed out, the principal utility of our compounds is in the field of DDT synergists where, as shown in the foregoing table, a most surprising reduction of quantity of synergistic mixture (as compared with the quantity of DDT alone) results in effective kills of DDT-resistant insect strains (the effectiveness of the compositions being in inverse ratio to their numerical $LD_{50}$ ratings). This is borne out by a control computation on the synergistic effect on a number of the above 2,2-difluoro compounds, as compared with the synergistic effect with DDT of the corresponding 2,2,2-trifluoro compounds reported by Tahori, supra.

TABLE II

|   | 1 Part 2,2-Difluoro Compound to 5 Parts DDT |   | 1 Part 2,2,2-Trifluoro Compound to 1 Part DDT | 1 Part 2,2,2-Trifluoro Compound to 10 Parts DDT |
|---|---|---|---|---|
| 2,2-Difluoro-1,1-bis-(p-chlorophenyl)-ethane | 171 | 2,2,2-Trifluoro-1,1-bis-(p-chlorophenyl)-ethane | 14 | 0 |
| 2,2-Difluoro-1,1-bis-(p-chlorophenyl)-ethanol | 194 | 2,2,2-Trifluoro-1,1-bis-)p-chlorophenyl)-ethanol | 25 | 15 |
| 2,2-Difluoro-1,1-bis-(p-chlorophenyl(-ethyl acetate | 71 | 2,2,2-Trifluoro-1,1-bis-(p-chlorophenyl)-ethyl acetate | 15 | 11 |
| 2,2-Difluoro-1,1-bis-(p-bromophenyl)-ethane | 125 | 2,2,2-Trifluoro-1,1-bis-(p-bromophenyl)-ethane | 10 | 0 |
| 2,2-Difluoro-1,1-bis-(p-bromophenyl)-ethanol | 169 | 2,2,2-Trifluoro-1,1-bis-(p-bromophenyl)-ethanol | 16 | 12 |
| 2,2-Difluoro-1,1-bis-(p-bromophenyl)-ethyl acetate | 71 | 2,2,2-Trifluoro-1,1-bis-(p-bromophenyl)-ethyl acetate | 14 | 10 |
| 2,2-Difluoro-1,1-bis-(p-fluorophenyl)-ethanol | 42 | 2,2,2-Trifluoro-1,1-bis-(p-fluorophenyl)-ethanol | 10 | 10 |

In the foregoing table, Tahori's definition of synergistic activity was used in lieu of an $LD_{50}$ rating, namely the factor by which it is possible to reduce the amount of DDT and still obtain the same mortality; for example, with 2,2,2-trifluoro-1,1-bis-(p-chlorophenyl)-ethanol bis-(p-chlorophenyl)-trifluoromethyl-carbinol) could be reduced 15 times (1:15). Thus a high numerical rating in Table II indicates a high degree of synergism. It should be noted in this connection that the tests reported by Tahori, supra, were conducted on a DDT-resistant strain of Palestinian houseflies ("T" strain) which appear, by reason of Tahori's comparison of that strain with a "Berkeley" strain, to have less immunity to DDT than the DDT-resistant houseflies on which our tests were conducted.

For economic reasons it is advisable to apply our new insecticides, when used as the sole active ingredient or in synergistic combination with DDT, by the use of a proper solid or liquid diluent, e.g., of the type customarily used with DDT, such as carbon black, talc, pyrophyllite, hydrocarbon solvent, alcohol, or aqueous emulsion.

The term DDT, as used in the specification and claims, denotes dichlorodiphenyltrichloroethane (pure or technical grade).

It will thus be seen that we have provided a series of new insecticidal compounds which are particularly effective as DDT synergists; they may be arranged as to the degree of synergistic efficiency in the following general order:

2,2-difluoro-1,1-bis-(p-halophenyl)-ethanols
2,2-difluoro-1,1-bis-(p-halophenyl)-ethanes
2,2-difluoro-1,1-bis-(p-halophenyl)-ethyl acetates
2-fluoro-1,1-bis-(p-halophenyl)-ethenes Bromine and chlorine are generally superior to fluorine as synergistically efficient substituents in the phenyl groups of the above-named compounds; while the para position is generally preferred, the meta and ortho positions are not excluded from the purview of our invention.

Having thus described our invention and several modes by which the same may be carried into practice, it will be clear that several modifications and changes thereof may

We claim:

1. An insecticidal composition comprising as its essential active ingredients DDT and as a synergist therefor a member of the group consisting of a compound having the formula:

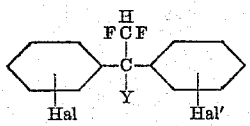

wherein Hal and Hal' are halogen atoms having an atomic weight not above 80 and wherein Y is a member of the group consisting of hydrogen, hydroxyl and acetoxyl, and of a compound having the formula:

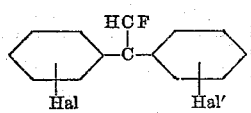

wherein Hal and Hal' have the same meanings as aforesaid, said synergist being present in an amount not in excess of the amount of said DDT.

2. An insecticidal composition comprising as its essential active ingredients DDT and as a synergist therefor a 2,2-difluoro-1,1-bis-(p-halophenyl)-ethane, the atomic weight of the halogen atom attached to phenyl being not above 80, said synergist being present in an amount not in excess of the amount of said DDT.

3. An insecticidal composition comprising as its essential active ingredients DDT and as a synergist therefor a 2,2-difluoro-1,1-bis-(p-halophenyl)-ethanol, the atomic weight of the halogen atom attached to phenyl being not above 80, said synergist being present in an amount not in excess of the amount of said DDT.

4. An insecticidal composition comprising as its essential active ingredients DDT and as a synergist therefor a 2,2-difluoro-1,1-bis-(p-halophenyl)-ethyl acetate, the atomic weight of the halogen atom attached to phenyl being not above 80, said synergist being present in an amount not in excess of the amount of said DDT.

5. An insecticidal composition comprising as its essential active ingredients DDT and 2,2-difluoro-1,1-bis-(p-chlorophenyl)-ethane as a synergist therefor, said synergist being present in an amount not in excess of the amount of said DDT.

6. An insecticidal composition comprising as its essential active ingredients DDT and 2,2-difluoro-1,1-bis-(p-chlorophenyl)-ethanol as a synergist therefor, said synergist being present in an amount not in excess of the amount of said DDT.

7. An insecticidal composition comprising as its essential active ingredients DDT and 2,2-difluoro-1,1-bis-(p-chlorophenyl)-ethyl acetate as a synergist therefor, said synergist being present in an amount not in excess of the amount of said DDT.

8. An insecticidal composition comprising as its essential active ingredients DDT and 2,2-difluoro-1,1-bis-(p-bromophenyl)-ethanol as a synergist therefor, said synergist being present in an amount not in excess of the amount of said DDT.

9. An insecticidal composition comprising as its essential active ingredients DDT and as a synergist therefor a 2-fluoro-1,1-bis-(p-halophenyl)-ethene, the atomic weight of the halogen atom attached to phenyl being not above 80, said synergist being present in an amount not in excess of the amount of said DDT.

10. An insecticidal composition comprising as its essential active ingredients DDT and 2-fluoro-1,1-bis-(p-bromophenyl)-ethene as a synergist therefor, said synergist being present in an amount not in excess of the amount of said DDT.

11. Method of killing DDT-resistant insects which comprises contacting them with a synergistic insecticidal composition comprising as its essential active ingredients DDT and a member of the group consisting of a compound having the formula:

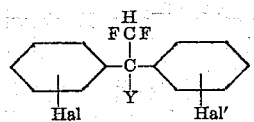

wherein Hal and Hal' are halogen atoms having an atomic weight not above 80 and wherein Y is a member of the group consisting of hydrogen, hydroxyl and acetoxyl, and of a compound having the formula:

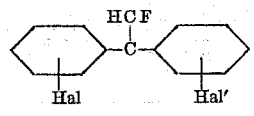

wherein Hal and Hal' have the same meanings as aforesaid.

12. Method of killing DDT-resistant insects which comprises contacting them with a synergistic insecticidal composition comprising as its essential active ingredients DDT and a 2,2-difluoro-1,1-bis-(p-halophenyl)-ethane, the atomic weight of the halogen attached to phenyl being not above 80.

13. Method of killing DDT-resistant insects which comprises contacting them with a synergistic insecticidal composition comprising as its essential active ingredients DDT and a 2,2-difluoro-1,1-bis-(p-halophenyl)-ethanol, the atomic weight of the halogen attached to phenyl being not above 80.

14. Method of killing DDT-resistant insects which comprises contacting them with a synergistic insecticidal composition comprising as its essential active ingredients DDT and a 2,2-difluoro-1,1-bis(p-halophenyl)-ethyl acetate, the atomic weight of the halogen attached to phenyl being not above 80.

15. Method of killing DDT-resistant insects which comprises contacting them with a synergistic insecticidal composition comprising as its essential active ingredients DDT and 2,2-difluoro-1,1-bis-(p-chlorophenyl)-ethane.

16. Method of killing DDT-resistant insects which comprises contacting them with a synergistic insecticidal composition comprising as its essential active ingredients DDT and 2,2-difluoro-1,1-bis-(p-chlorophenyl)-ethanol.

17. Method of killing DDT-resistant insects which comprises contacting them with a synergistic insecticidal composition comprising as its essential active ingredients DDT and 2,2-difluoro-1,1-bis-(p-chlorophenyl)-ethyl acetate.

18. Method of killing DDT-resistant insects which comprises contacting them with a synergistic insecticidal composition comprising as its essential active ingredients DDT and 2,2-difluoro-1,1-bis-(p-bromophenyl)-ethanol.

19. Method of killing DDT-resistant insects which comprises contacting them with a synergistic insecticidal composition comprising as its essential active ingredients DDT and a 2-fluoro-1,1-bis-(p-halophenyl)-ethene, the atomic weight of the halogen attached to phenyl being not above 80.

20. Method of killing DDT-resistant insects which comprises contacting them with a synergistic insecticidal composition comprising as its essential active ingredients DDT and 2-fluoro-1,1-bis-(p-bromophenyl)-ethene.

21. Method of killing insects which comprises contacting them with a 2-fluoro-1,1-bis-halophenyl-ethene, the atomic weight of the halogen atom attached to phenyl being not above 80.

(References on following page)

References Cited in the file of this patent

UNITED STATES PATENTS

| | | |
|---|---|---|
| Re. 22,700 | Muller | Dec. 4, 1945 |
| Re. 22,922 | Muller | Sept. 30, 1947 |
| 2,238,242 | Balon | Apr. 15, 1941 |
| 2,455,643 | Bakalar | Dec. 7, 1948 |

OTHER REFERENCES

Jour. Econ. Ent., vol. 41, June 1948, pp. 416–421 (Table No. 2, p. 418 relied on); vol. 48 (1955), pp. 638–642.

J.A.C.S., vol. 77 (1955), pp. 4164–4168.

UNITED STATES PATENT OFFICE
CERTIFICATE OF CORRECTION

Patent No. 2,990,321                                June 27, 1961

Joseph Bornstein et al.

It is hereby certified that error appears in the above numbered patent requiring correction and that the said Letters Patent should read as corrected below.

Column 4, line 65, for "-ethene" read -- -ethane --; same column 4, in the fifth table thereof, column 2, line 3 thereof, for "26.52" read -- 26.53 --; column 5, line 38, for "doses" read -- dose --; columns 5 and 6, TABLE II, column 3, line 2 thereof, for "-)p-chlorophenyl)-" read -- -(p-chlorophenyl)- --; same TABLE II, column 1, line 3 thereof, for "-(p-chlorophenyl(-" read -- -(p-chlorophenyl)- --.

Signed and sealed this 23rd day of January 1962.

(SEAL)

Attest:

ERNEST W. SWIDER                               DAVID L. LADD
Attesting Officer                                   Commissioner of Patents